United States Patent
Leizerovich et al.

(10) Patent No.: US 12,446,107 B2
(45) Date of Patent: Oct. 14, 2025

(54) INTERFERING IN TIME-DIVISION DUPLEX COMMUNICATION

(71) Applicant: D-FEND SOLUTIONS AD LTD., Raanana (IL)

(72) Inventors: Hanan Leizerovich, Petah Tikva (IL); Assaf Monsa Chermon, Kfar Yedida (IL)

(73) Assignee: D-FEND SOLUTIONS AD LTD., Raanana (IL)

( * ) Notice: Subject to any disclaimer, the term of this patent is extended or adjusted under 35 U.S.C. 154(b) by 781 days.

(21) Appl. No.: 17/656,806

(22) Filed: Mar. 28, 2022

(65) Prior Publication Data
US 2023/0012215 A1    Jan. 12, 2023

(51) Int. Cl.
*H04W 76/30*    (2018.01)
*H04L 5/14*    (2006.01)
(Continued)

(52) U.S. Cl.
CPC ........... *H04W 76/30* (2018.02); *H04L 5/1469* (2013.01); *H04W 72/02* (2013.01);
(Continued)

(58) Field of Classification Search
CPC ............. H04W 72/02; H04W 72/0446; H04W 72/0453; H04W 72/541; H04W 76/30; H04L 5/1469; H04K 3/42
See application file for complete search history.

(56) References Cited

U.S. PATENT DOCUMENTS

| | | | |
|---|---|---|---|
| 2011/0223851 A1* | 9/2011 | Stoddard ................. | H04K 3/44 455/1 |
| 2013/0023201 A1* | 1/2013 | Coleman ................. | H04K 3/44 455/1 |
| 2020/0029337 A1* | 1/2020 | Leizerovich ........... | H04B 7/212 |

FOREIGN PATENT DOCUMENTS

WO    2020021529 A1    1/2020

* cited by examiner

*Primary Examiner* — Rina C Pancholi
(74) *Attorney, Agent, or Firm* — Reches Patents

(57) ABSTRACT

A method for disconnecting a wireless time-division duplex communication link. The time-division duplex communication link being between a first node transmitting during time slots allocated to said first node and a second node, wherein the second node is transmitting during separate time slots allocated to said second node, said first node transmitting at a respective one of a plurality of frequency bands during each of said time slots allocated to said first node. The method may include sub-dividing a time slot allocated to said first node into consecutive time intervals; disrupting communication between said first node and said second node by transmitting, using a transmitter, respective interference signals during at least some of said time intervals while maintaining a frequency difference between any pair of consecutive interference signals below a frequency difference threshold, each of said interference signals being transmitted on one frequency band selected from a group of frequency bands, the group of frequency bands comprises the plurality of frequency bands, wherein for at least two of said time intervals said interference signals are transmitted on different frequency bands, wherein the frequency difference threshold does not exceed a portion of a frequency gap between (a) a lowest frequency band of the plurality of frequency bands and (b) a highest frequency band of the plurality of frequency bands.

40 Claims, 14 Drawing Sheets

(51) Int. Cl.
*H04W 72/02* (2009.01)
*H04W 72/0446* (2023.01)
*H04W 72/0453* (2023.01)
*H04W 72/541* (2023.01)

(52) U.S. Cl.
CPC ... *H04W 72/0446* (2013.01); *H04W 72/0453* (2013.01); *H04W 72/541* (2023.01)

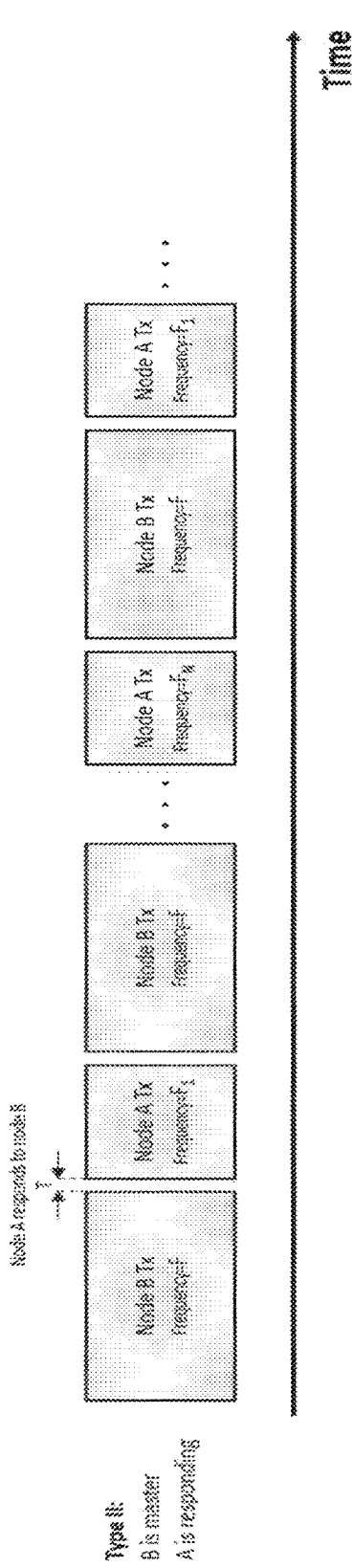
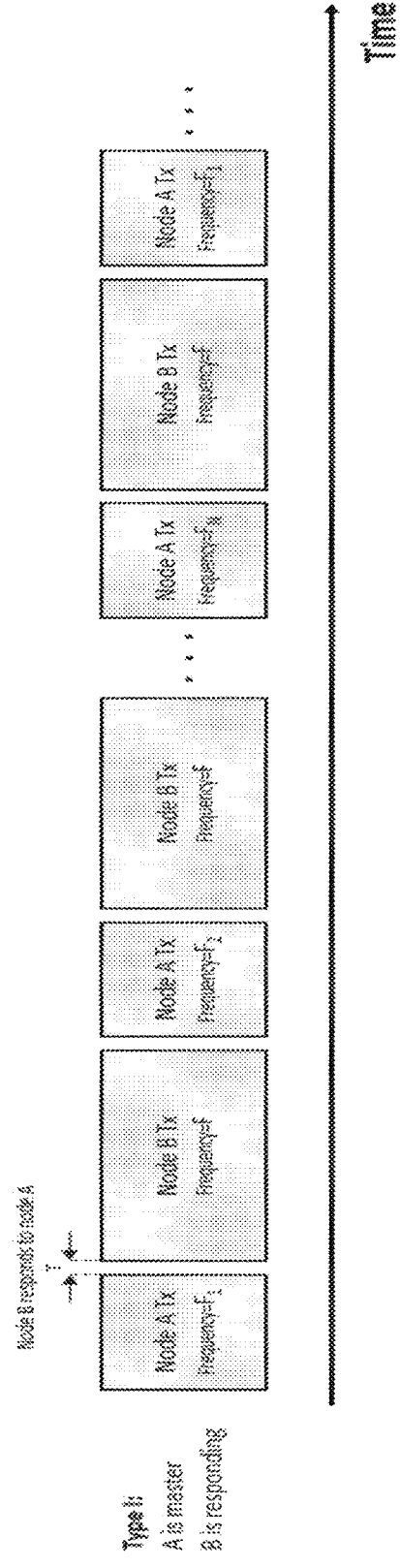
FIGURE 7A
FIGURE 7B

INTERFERING IN TIME-DIVISION DUPLEX COMMUNICATION

FIELD AND BACKGROUND OF THE INVENTION

The present invention, in some embodiments thereof, relates to time division duplex communication and, more particularly, but not exclusively, to interfering with time division duplex communication.

In time division duplex (TDD) communication, transmissions by network nodes are separated into different time slots. In some cases, the nodes use different transmission schemes. For example, one node transmits frequency hopping packets whereas a second node transmits fixed frequency packets during their respective allocated time slots.

Time-division duplexing has a strong advantage in the case where there is asymmetry of the uplink and downlink data rates. As the amount of uplink data increases, more communication capacity can be dynamically allocated, and as the traffic load becomes lighter, capacity can be taken away.

In some cases, wideband jamming signals are used to disrupt communication uplink and/or downlink communication. In order to interfere with Node B's reception of transmissions from Node A, a wide band jamming signal is transmitted towards Node B. The jamming signal may be a high bandwidth (BW) noise signal (such as white Gaussian noise) or any other wide band signal (such as actual data or a chirp signal).

One disadvantage of wideband jamming solutions is possible interference to other communication links in the area. Another disadvantage is loss of power, because the power is distributed over the full bandwidth. In addition, jamming solutions do not use a disconnect command and hence can only cause the two nodes to disconnect by raising the bit error rate (BER) or reducing the packet detection rate in Node B's reception of Node A.

Another approach to this problem is to transmit a pulsed jamming signal during the Node A time slot at all the known frequencies used by Node A in parallel. The disadvantage of the solutions above is still loss of power, as the power is distributed over Node A's entire frequency range. Also, as in the previous solution, this jamming technique does not contain a disconnect command.

Additional background art includes:

[1] M. Karlsson et al., "Jamming a TDD Point-to-Point Link Using Reciprocity-Based MIMO", *IEEE Transactions on Information Forensics and Security*, 12(12), pp. 2957-2970, 11 Jul. 2017.

[2] International Patent Application Publication No. WO 93/26124.

[3] K. Grover et al., "Jamming and Anti jamming Techniques in Wireless Networks: A Survey", *International Journal of Ad Hoc and Ubiquitous Computing* Volume 17 Issue 4, Pages 197-215, December 2014.

[4] International Patent Application Publication No. WO 93/22850.

[5] K. Parlin, "Jamming of Spread Spectrum Communications Used in UAV Remote Control Systems", TALLINN UNIVERSITY OF TECHNOLOGY School of Information Technologies, 2017.

SUMMARY OF THE INVENTION

Embodiments of the invention intend to disconnect and/or interfere with communication between nodes in a TDD communication link in which at least one of the nodes (denoted herein Node A) transmits at different respective frequency bands during different times slots allocated to it (i.e. frequency hopping). Transmissions by Node A are interfered with by transmitting a sequence of high-power short disconnect signals during each time slot allocated to Node A. Each disconnect signal is transmitted during a respective time interval within the Node A time slot. Because the disconnect apparatus transmits over only a single Node A frequency band at any given time interval, the transmission power of the disconnect signal can be maximized at each of the frequency bands during a portion of the Node A time slot. Optionally the disconnect signals are modulated with a disconnect command, which when received by Node B causes Node B to disconnect from Node A. Optionally, the disconnect signals may be a predefined pattern and/or a noise signal aimed at interfering with the communication between Node A and Node B. The disconnect command is an example of an interference signal.

In some embodiments disconnect signals are transmitted over more than one frequency band during a given time interval. Although in this embodiment transmission power is divided amongst multiple frequency bands, it is nonetheless higher than it would be if the disconnect signal covered the entire Node A frequency range.

According to a first aspect of some embodiments of the present invention there is provided a method for disconnecting a wireless time-division duplex communication link between a first node transmitting during time slots allocated to the first node and a second node transmitting during separate time slots allocated to the second node. The first node transmits at differing respective frequency bands during its time slots. The method includes:

sub-dividing a time slot allocated to the first node into consecutive time intervals; and transmitting respective disconnect signals during the time intervals.

Each of the disconnect signals is transmitted on a frequency band used by the first node. The disconnect signals are transmitted on different frequency bands during at least two of the time intervals.

According to a second aspect of some embodiments of the present invention there is provided an apparatus for disconnecting a wireless time-division duplex communication link between a first node transmitting during time slots allocated to the first node and a second node transmitting during separate time slots allocated to the second node. The first node transmits at differing respective frequency bands during its time slots. The apparatus includes a signal generator and a wireless transmitter. The signal generator sub-divides a time slot allocated to the first node into consecutive time intervals and generates respective disconnect signals for multiple time intervals. Each of the disconnect signals occupies a respective one of the frequency bands. The disconnect signals are on different frequency bands for at least two of the time intervals. The wireless transmitter transmits the disconnect signals at the respective time intervals.

According to some implementations of the first aspect or second aspect of the invention, for at least one of the time intervals the disconnect signal is data modulated.

According to some implementations of the first aspect or second aspect of the invention, for at least one of the time intervals the disconnect signal is modulated with a disconnect command for the second node.

According to some implementations of the first aspect or second aspect of the invention, for at least one of the time intervals the disconnect signal is modulated with a pseudo-random data sequence.

According to some implementations of the first aspect or second aspect of the invention, for at least one of the time intervals the disconnect signal is one of: a predefined jamming signal and a random noise signal.

According to some implementations of the first aspect or second aspect of the invention, transmissions by the second node are monitored and an upcoming time slot of the first node is predicted based on the monitored transmissions.

According to some implementations of the first aspect or second aspect of the invention, transmission of the disconnect signals is initiated when a cessation of transmission by the second node is detected.

Transmissions by the second node are analyzed to identify a disconnection of communication between the first and second nodes, and when such a disconnection is identified, direct communication is attempted with the second node. Another response of the first and second nodes to the interruption may include switching to another group of frequencies in which the communication may resume. The identification may be of a cessation of the transmission in the pattern that was used, or by analyzing the data received from the second node.

For example—a remote controller would (when directed by the UAV to do so because the UAV cannot receive its transmissions) switch to another group of frequencies, while the UAV will keep transmitting in the same frequency it used to before the interruption started. In this case the system may detect from the data transmitted in the UAV's packets that the remote controller was directed to switch to another group of frequencies.

When such a switch happens, a similar change is done in the transmission of the disconnect signal so that the new set of frequency bands is used.

According to some implementations of the first aspect or second aspect of the invention, transmissions by the second node are analyzed to identify a disconnection of communication between the first and second nodes, and when such a disconnection is identified, direct communication is established with the second node According to some implementations of the first aspect or second aspect of the invention, the respective frequency bands are selected from a specified list of frequency bands.

According to some implementations of the first aspect or second aspect of the invention, disconnect signals are transmitted over an entire frequency range used by the first node during a single time slot.

According to some implementations of the first aspect or second aspect of the invention, the first node transmits in a known order of the frequency bands, and the disconnect signals are transmitted in the known order. The phase of the order of transmitted disconnect signals is changed by transmitting one of the disconnect signals at frequency band out of the known order and continuing subsequent disconnect signal transmissions in the known order. This phase change may be performed more than once while interfering with the transmissions. Such a phase change may be required when the system identifies that the connection between the nodes has not been interrupted, which may happen because the phase used is not the correct one. The system may change the phase several times until a disconnect has happened.

According to some implementations of the first aspect or second aspect of the invention, the entire frequency range used by the first node is interfered with by the disconnect signals during a single time slot of the first node.

According to some implementations of the first aspect or second aspect of the invention, the respective frequency bands for the disconnect signals are selected as successive frequency bands over the frequency range used by the first node.

According to some implementations of the first aspect or second aspect of the invention, at least two disconnect signals are transmitted in parallel on respective ones of the frequency bands for at least one of the time intervals. The number of disconnect signals transmitted in parallel is fewer than a total number of the frequency bands.

According to some implementations of the first aspect or second aspect of the invention, a first subset of the frequency bands is transmitted during a time slot of the first node and a second subset of the frequency bands is transmitted during a subsequent time slot of the first node.

According to third aspect of some embodiments of the present invention there is provided a method for controlling an apparatus interfering with wireless time-division duplex communication. The time-division duplex communication is between a first node transmitting during time slots allocated to the first node and a second node transmitting during separate time slots allocated to the second node. The first node transmits at differing respective frequency bands during its time slots. The method includes:

receiving, using a receiver, wireless transmissions from the second node;

determining a time slot allocated to the first node based on the received transmissions and subdividing the determined time slot into consecutive time intervals; and instructing the apparatus to transmit respective disconnect signals during a plurality of the time intervals, each of the disconnect signals being for transmission on a respective one of the plurality of frequency bands, wherein for at least two of the time intervals the disconnect signals are transmitted on different frequency bands.

According to a fourth aspect of some embodiments of the present invention there is provided a controller for a wireless disconnect apparatus for interfering with wireless time-division duplex communication link The time-division duplex communication is between a first node transmitting during time slots allocated to the first node and a second node transmitting during separate time slots allocated to the second node. The first node transmits at differing respective frequency bands during its time slots. The apparatus includes:

a receiver which receives wireless transmissions from the second node;

a signal analyzer which:

determines a time slot allocated to the first node based on the received transmissions;

subdivides the time slot into consecutive time intervals; and instructs the disconnect apparatus to transmit respective disconnect signals during a plurality of the time intervals, each of the disconnect signals being for transmission on a respective one of the plurality of frequency bands, wherein for at least two of the time intervals the disconnect signals are transmitted on different frequency bands.

According to some implementations of the third aspect or fourth aspect of the invention, at least one signal parameter for generation of the disconnect signals is provided to the apparatus. According to some further implementations of the third aspect or fourth aspect of the invention, the signal parameter includes:

a type of disconnect signal to transmit;
data for modulating onto a disconnect signal;
a duration of the time slot;
respective durations of the time intervals;
the respective frequency bands for the disconnect signals;
respective transmission powers for the disconnect signals; and
a number of disconnect signals to transmit in parallel.

According to some implementations of the third aspect or fourth aspect of the invention, the apparatus is instructed to transmit, on at least one of the disconnect signals, a disconnect command for disconnecting the second node from the first node.

According to some implementations of the third aspect or fourth aspect of the invention, disconnection of communication between the first and second nodes is detected from the received transmissions and the apparatus is instructed to establish direct communication with the second node.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A-7C illustrate respective timing scenarios for TDD communication links;

DESCRIPTION OF SPECIFIC EMBODIMENTS OF THE INVENTION

Figure 1:
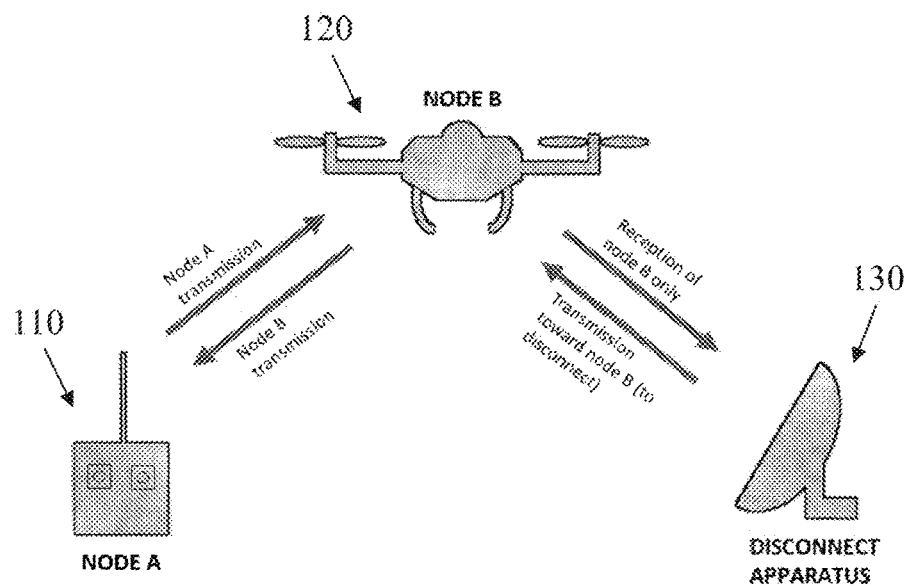
FIG. 1 illustrates an exemplary scenario for interfering with a TDD communication link between nodes A and B.

The present invention, in some embodiments thereof, relates to time division duplex communication and, more particularly, but not exclusively, to interfering with time division duplex communication.

TDD communications links are often used for wireless communication between a controller and an unmanned aerial vehicle (UAV), such as a drone. TDD is particularly suited for this use because of the typical asymmetry of the uplink communication (from controller to UAV) relative to the downlink (from UAV to controller).

Embodiments of the invention interfere with a time-division duplex communication link between two nodes, in order to disconnect the two nodes. The goal is to perform this disconnection with minimal interference to other communication links within the area.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference is now made to FIG. 1, which illustrates an exemplary scenario for interfering with a TDD communication link between two nodes. Node A 110 transmits frequency hopping packets to Node B 120. Node B 120 transmits fixed frequency packets to Node A 110. Node B 120 and Node A 110 transmit in different time frames. Disconnect apparatus 130 transmits signals which are received by Node B 120 and are designed to disconnect Node B 120 from Node A 110. Typically, transmissions from Node B 120 are received by disconnect apparatus 130, but transmissions from Node A 110 are not received and therefore cannot be analyzed by disconnect apparatus 130.

For clarity, the description herein presents non-limiting exemplary embodiments in which the TDD communication link is between two nodes (denoted herein Node A and Node B), and in which it is desired to disconnect Node B from Node A. As will be appreciated by the skilled person, other embodiments of the invention may be implemented for TDD communication links with more than two nodes (e.g. a single controller controlling multiple drones or multiple controllers controlling multiple drones).

I. Method for Interfering with a TDD Communication Link

Figure 2:
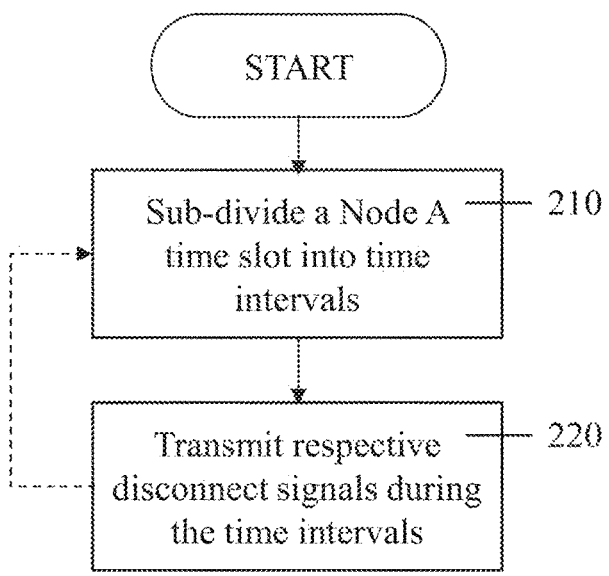
FIG. 2 is a simplified flow chart of a method for disconnecting a wireless time-division duplex communication link, according to embodiments of the invention.

Reference is now made to FIG. 2, which is a simplified flow chart of a method for disconnecting a wireless time-division duplex communication link, according to embodiments of the invention. The time-division duplex (TDD) communication link is between a first node (denoted herein Node A) transmitting during time slots allocated to Node A and a second node (denoted herein Node B) transmitting during separate time slots allocated to Node B.

As used herein the term "separate time slots" means that Node A's time slots do not overlap with Node B's time slots.

Node A transmits at multiple frequency bands. During each of its allocated time slots, Node A transmits at a respective one of these frequency bands. Node A may transmit in a fixed hop pattern (i.e. in a predetermined repetitive order) or the frequency bands used by Node A transmission may vary in a different manner. The frequency bands used by Node A should be known or detectable by Node B, so that Node B is able to receive Node A's transmissions correctly.

In 210, a time slot allocated to the first node is sub-divided into consecutive time intervals. Methods for identifying or determining a Node A time slot are described below.

As used herein the term "consecutive time intervals" means that the time intervals are in a non-overlapping sequence which begins at the start of the time slot and ends at the end of the time slot. Optionally the time interval duration is the same for each of Node A's time slots. Alternately, some or all of the time slots are divided into different sequences of time interval durations.

In 220, respective disconnect signals are transmitted during some or all of the time intervals. Each disconnect signal is transmitted on one of Node A's frequency bands. The disconnect signals are transmitted on different frequency bands during at least two of the time intervals. Optionally, when Node A's frequency bands are not accurately known, disconnect signals are transmitted at frequency bands which are expected to be used by Node A.

Optionally, during a single Node A time the disconnect signals cover the entire frequency range used by the Node A.

Optionally, the respective frequency bands for the disconnect signals are selected from a specified list of frequency bands. The list may include frequency bands known to be used by Node A. This approach is beneficial when Node A does not transmit over a continuous frequency range but rather at certain frequency bands within its total frequency range.

As used herein the term "aggregated disconnect signal" means the entire disconnect signal transmitted in a single time slot. The aggregated disconnect signal is built from the multiple short disconnect signals which are transmitted during respective time intervals within a single time slot. The aggregated disconnect signal may be built in the same manner for all Node A time slots, or in different manners for different time slots. For example, in some Node A time slots the aggregated disconnect signal may cover Node A's entire frequency range whereas in other time slots only a portion or portions of Node A's frequency range is interfered with.

Optionally, a single disconnect signal (i.e. a signal at a single frequency band) is transmitted in each time interval, therefore the transmission power is concentrated in one frequency band.

Figure 3A:
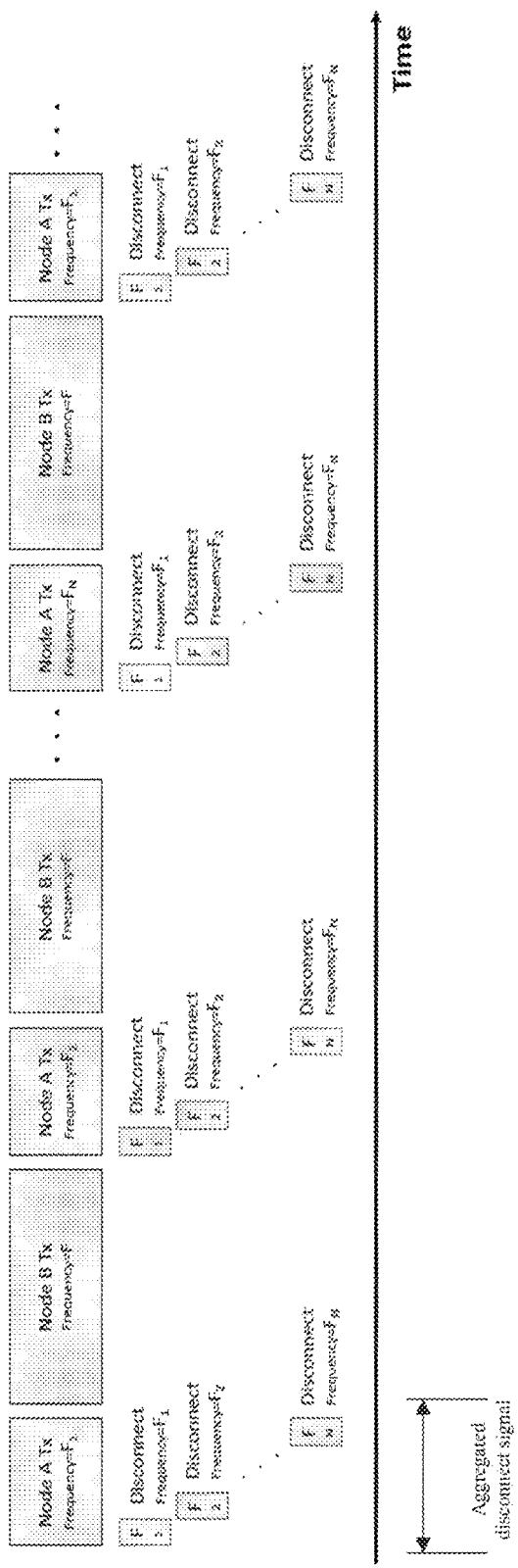
FIGS. 3A-5 illustrate aggregated disconnect signals used to interfere with a TDD communication link, according to respective exemplary embodiments of the invention.

FIG. 3A illustrates an exemplary embodiment in which Node A transmissions are interfered with by the staggered transmission of the disconnect signals during the Node A time slot. The Node A time slot is sub-divided into N time intervals. A singe disconnect signal is transmitted during each of the time intervals. If Node A's frequency bands (F1-FN) cover a continuous frequency range, then the aggregated disconnect signal covers the entire frequency range. If F1-FN are portions of Node A's total frequency range, the aggregated disconnect signal interferes with all frequency bands used by Node A. In FIG. 3A the frequency bands of the aggregated disconnect signal are transmitted in the same order during each Node A time slot.

Figure 3B:
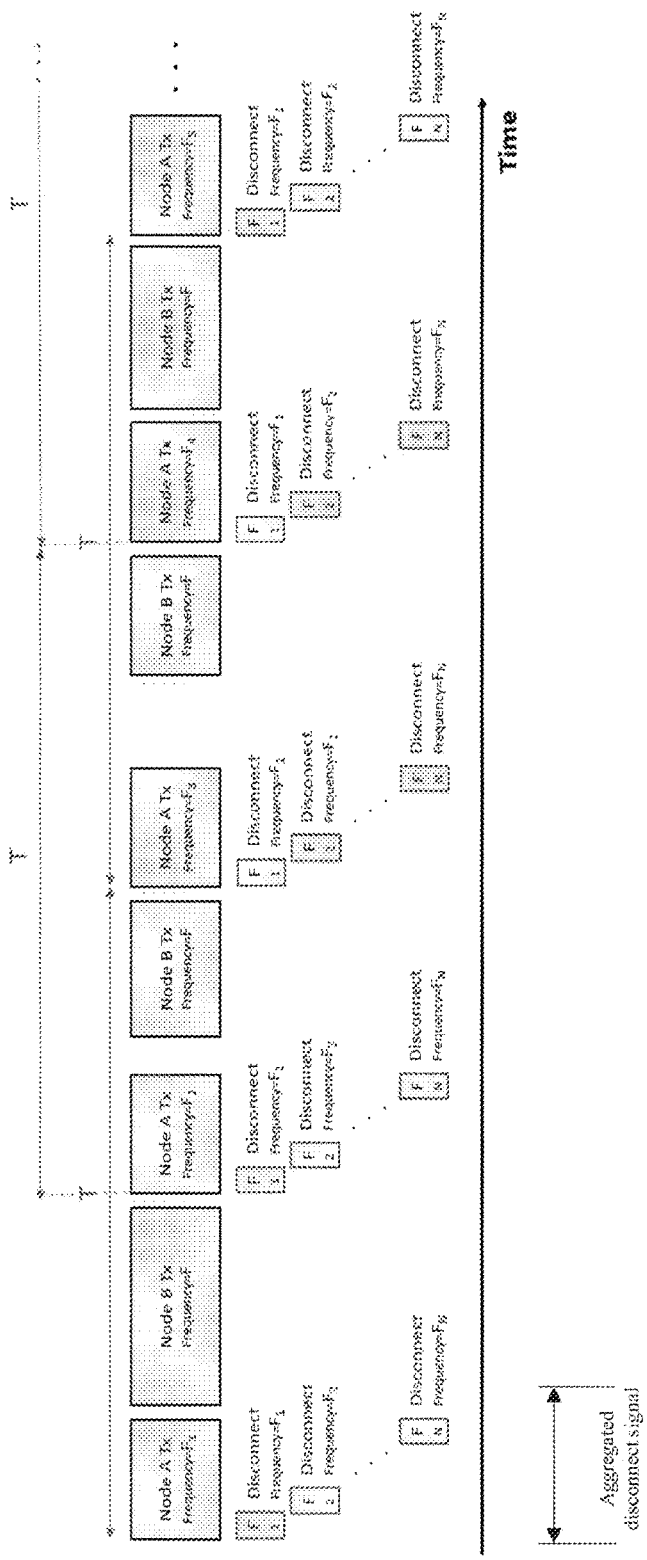

FIG. 3B illustrates an exemplary embodiment in which Node A sends multiple packets at different phases but in a constant cycle. As in FIG. 3A, the Node A transmissions are interfered with by the staggered transmission of the disconnect signals during the Node A time slot.

Figure 4:
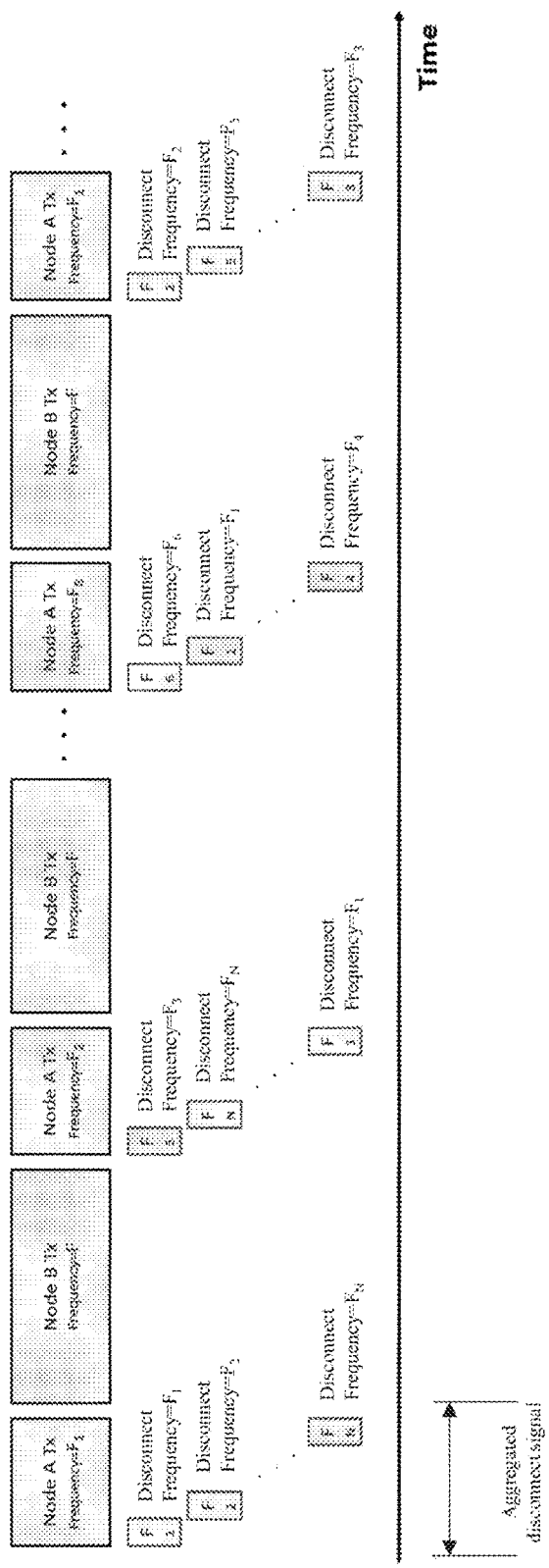

FIG. 4 illustrates an alternate exemplary embodiment in which the order of the frequency bands within the aggregated disconnect signal is different for different Node A time slots.

Figure 5:
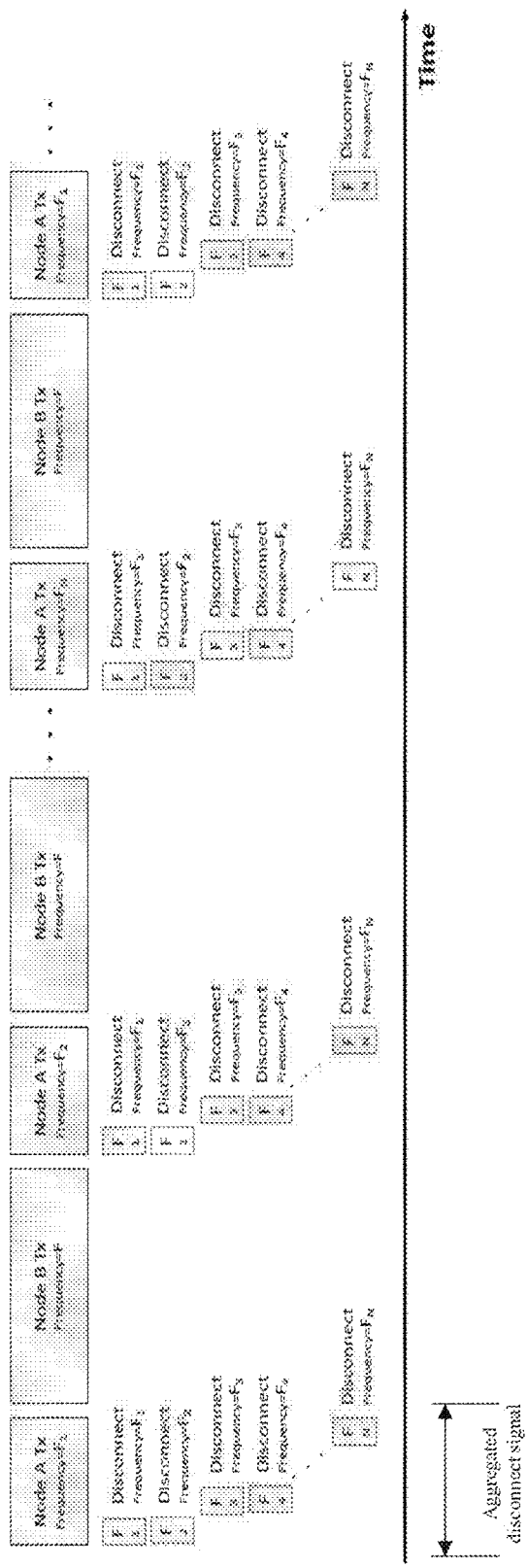

Alternately, during at least one of the time intervals, two or more disconnect signals are transmitted in parallel. FIG. 5 shows an example in which the two disconnect signals at different frequency bands are transmitted during every time interval. Parallel transmission at multiple frequency bands may be useful when the number of time intervals available in a single Node A time slot is fewer than the number of Node A frequency bands. In order to cover all of the Node A frequency bands during a single Node A time slot, it is necessary to transmit at more than one frequency band in a given time interval. This technique may also be beneficial when the available transmission power is high enough to interfere with multiple frequency bands in parallel (e.g. when Node B transmissions are received at a high power indicating that Node B is close).

Optionally, only a subset of the Node A frequency bands is interfered with by a disconnect signal during a single Node A time slot and a second subset of Node A frequency bands is interfered with during a different Node A time slot. As above, this may be useful when the number of time intervals available in a single Node A time slot is fewer than the number of Node A frequency bands. This embodiment is also useful when there is some knowledge regarding the possible frequency bands that Node A may transmit in.

Assigning respective frequency bands to the time intervals in the aggregated time signal may be done by any means known in the art. Embodiments of assigning frequency bands to respective time intervals include but are not limited to:

i) A predefined order;
  ii) According to specified rules; and
  iii) Randomly.

The assignment may take into account additional information such as known information about the TDD communication link and/or information gathered by analyzing transmissions received from Node B.

In some embodiments, Node A transmits in a known hop pattern. Although the order of the frequency bands used by Node A is known, the Node A transmissions are not received so it is not known which frequency band is currently being used. This added information may be used to select the interference signals. An optional embodiment includes transmitting rapidly changing disconnect signals based on the known hop pattern, using partial frequencies from the list in order to additionally increase the disconnect signal power. For example, assume it is known that the order of Node A's frequencies is $F_1, F_2, F_3, \ldots, F_N$. Then $F_1, F_2, F_3, F_4$ and $F_5$ may be transmitted together in one aggregated disconnect signal in parallel with the first Node A packet and $F_2, F_3, F_4, F_5$ and $F_6$ may be transmitted together in a second aggregated disconnect signal in parallel with the second Node A packet. After some time, if disconnect is not achieved, the next sequence may be changed.

In this way the correct phase is eventually reached with a higher power, as there are fewer disconnect signals required to achieve disconnect.

II. Types of Disconnect Signals

In many TDD communication links a "disconnect command" may be issued from one of the nodes to the other. The disconnect command informs the recipient that the connection is terminated. The receiving node then terminates its side of the connection. In some cases, the nodes will then try to reestablish their connection in the same or in another timing phase. It is possible to disturb this type of communication by transmitting a disconnect signal carrying a disconnect command to Node B. When the disconnect signal is received by Node B at a higher signal-to-noise ratio (SNR) than the Node A packets, Node B may demodulate the disconnect signal instead of the packet sent by Node A. This causes the link between Node A and Node B to be broken.

Optionally, during at least one of the time intervals the disconnect signal is a data modulated carrier signal. Further optionally, the disconnect signal carries one or more data packets constructed in accordance with the TDD communication link protocol.

Optionally, one or more of the disconnect signals are modulated with a disconnect command or commands for Node B. The disconnect command is built according to the known protocol between Node A and Node B. The disconnect signal is typically a short signal, preferably shorter than $T_A/N$ ($T_A$ is Node A slot time and N is the number of known frequencies). If the shortest disconnect signal time $T_{dis}$ is longer than $T_A/N$, then in order to cover all the Node A frequencies it is necessary to transmit disconnect signals in $k=\text{floor}(N \cdot T_{dis}/T_A)$ frequencies in parallel.

In some cases, such as when the disconnect length is too long or the protocol between Node A and Node B is not known, a different type of disconnect signal may be used. In this case the disconnection is achieved by reducing the SNR of the reception of Node A signal by Node B. This causes a high bit error rate (BER) that will eventually fail the whole packet or frame due to failure in the parity check.

Other types of disconnect signals include but are not limited to:
  a) A noise signal, such as a predefined noise pattern, random noise or white Gaussian noise signal;
  b) A predefined jamming signal;
  c) A modulated pseudo-random binary sequence, optionally using a constant envelope such as BPSK; and
  d) A predefined binary sequence modulated as a constant envelope signal (such as any phase shift keying signal).

Using a noise or PSK disconnect signal is beneficial when Node B cannot receive a packet from the disconnect signal due to the parallel reception of Node A's packet).

The aggregated disconnect signal for a single time slot may be expressed as:

$$J(t) = N(t) \cdot \cos(2\pi f(t)t + \phi)$$

where N(t) is the aggregated disconnect signal, f(t) is the carrier frequency and $\phi$ is a constant or random phase. Optionally, N(t) is one of:
  i) A sequence of M packets containing the protocol specific command to disconnect; and
  ii) A predefined pattern (such as White Gaussian Noise, modulated Pseudo Random Binary Sequence, any modulated binary sequence or any predefined jamming signal).

Regarding Node A's Changing Carrier Frequency f(t):
A) In embodiments in which the disconnect signal carrier frequencies are a linear series $\{f_0 + n \cdot \Delta f\}$:

$$f(t) = f_0 + \Delta f \cdot \sum_{n=1}^{N-1} u(t - T_n)$$

$$T_n = T_{packet} \cdot \frac{n}{N}$$

$u(t) = \{1 \text{ if } t > 0; 0 \text{ otherwise}\}$

B) In embodiments in which the disconnect signal carrier frequencies are selected from a list $\{f_n\}$:

$$f(t) = \sum_{n=0}^{N-1} f_n \cdot (u(t - T_n) - u(t - T_{n+1}))$$

As shown in FIG. 4, the order of the frequencies within the aggregated disconnect signal may be different for transmissions in different time slots.

III. Disconnect Apparatus

Figure 6:
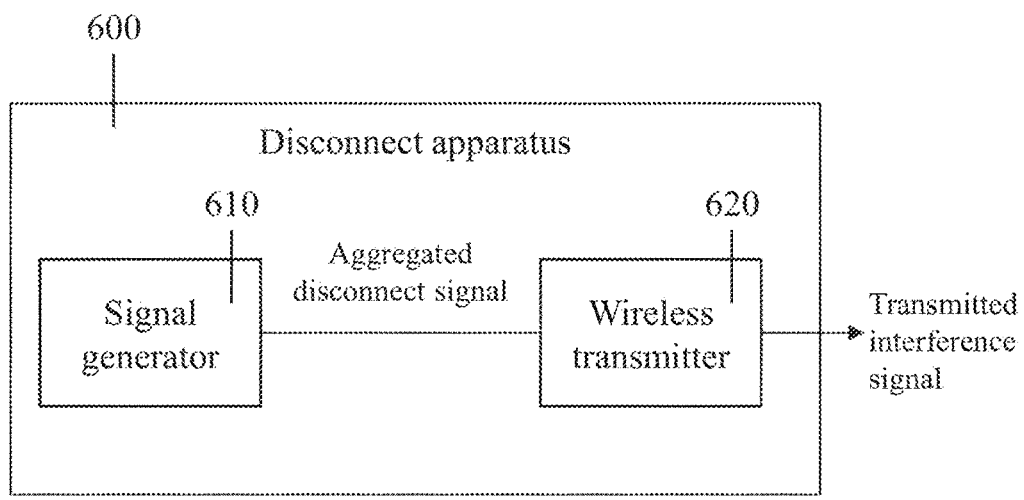
FIG. 6 is a simplified block diagram of a disconnect apparatus for disconnecting a wireless time-division duplex communication link, according to embodiments of the invention.

Reference is now made to FIG. 6, which is a simplified block diagram of a disconnect apparatus for disconnecting a wireless time-division duplex communication link, according to embodiments of the invention. As described above, the TDD communication link is between Node A which transmits at differing respective frequencies during its allocated time slots and Node B which transmits at a fixed frequency during its time slots.

Disconnect apparatus 600 includes signal generator 610 and wireless transmitter 620.

Signal generator 610 generates the aggregated disconnect signal for each Node A time slot by sub-dividing a time slot allocated to the first node into consecutive time intervals and generating respective disconnect signals for multiple time intervals. Each of the disconnect signals occupies a respective one of the Node A frequency bands, where during at least two of the time intervals the disconnect signals occupy different frequency bands.

In order to interfere with communications between Node A and Node B, the aggregated disconnect signal generated by signal generator 610 is transmitted by transmitter 620 during the respective Node A time slot, in parallel with the Node A transmissions.

As will be appreciated by the skilled person, signal generator 610 may be used to generate any of the disconnect signals and aggregate disconnect signals described herein, as required for a specific embodiment. For example, in some embodiments more than one disconnect signal (at different respective frequency bands) are transmitted during a single time interval.

Optionally, for at least one of the time intervals the disconnect signal is a carrier frequency in the respective frequency band, where the carrier signal is modulated with one of:
  a) a disconnect command for the second node (or one of several options of disconnect commands, if several exist);
  b) A noise signal, such as a predefined noise pattern, random noise or white Gaussian noise signal;
  c) A predefined jamming signal;
  d) A pseudo-random binary sequence, optionally using a constant envelope such as BPSK; and
  e) A predefined binary sequence (modulated as a constant envelope signal, for example any phase shift keying signal).

Optionally, during a given time slot signal generator 610 selects the respective frequency bands for the disconnect signals from a list of known frequency bands used by the Node A. Alternately or additionally, during a given time slot signal generator 610 selects the respective frequency bands for the disconnect signals as successive frequency bands over a frequency range used by Node A.

Optionally, during a single Node A time slot the entire frequency range used by the Node A is interfered with by the disconnect signals.

In the embodiment of FIG. 6, signal generator 610 and transmitter 620 are a single apparatus. In alternate embodiments, signal generator 610 is an add-on unit which provides the aggregated disconnect signals to a standalone transmitter.

IV. Monitoring Node B Communications

Optionally, Node B communications are monitored and analyzed in order to gather information about communication between Node A and Node B and/or parameters of the TDD communication link. The Node B transmissions may be monitored and/or analyzed continuously or intermittently.

Several Node B transmissions may be collected and analyzed in order to predict upcoming Node A time slots. The prediction may also be based on prior knowledge, such as that Node A is transmitting packets in a fixed cycle or that Node A is transmitting several packets in a fixed cycle (e.g. at 10 n msec and at 10 n+4 msec, which are two phases with a 10 msec cycle).

Types of information that may be obtained by this analysis include but are not limited to:
1) Identifying a disconnection between Nodes A and B. Optionally, when the disconnection is identified direct communication is established with Node B (for example by sending Node B a request to connect);
2) Identifying and/or predicting time slot(s) allocated to Node A and/or Node B. Knowledge of the start and/or stop times of the time slots enables transmitting the disconnect signals at the correct time;
3) The communication protocol used by Nodes A and B; and
4) The management of the Node A and Node B time slots (e.g. see FIGS. 7A-7C).

It is desired to transmit the aggregated disconnect signal during the Node A time slot for which it was built. Many ways of allocating time slots in TDD are known in the art. The embodiments presented herein are not limited to any particular type of slot allocation by the TDD communication link.

Alternately or additionally, the beginning of a Node A time slot is detected when Node B sends a request to reconnect. Node B transmissions are optionally analyzed to determine the protocol used by the TDD communication link, so that the request to reconnect may be identified in the Node B transmissions.

The decision when to begin transmission of the aggregated disconnect signal may be based on more of:
1) Detecting the beginning and/or end of Node B transmissions. Several Node B transmissions may be collected and analyzed together in order to "learn" the time slot pattern and predict an upcoming Node A time slot (e.g. transmission packet time) in advance. This may block signals (such as ACK responses) that are transmitted by Node A at the beginning of its time slot.
2) Identifying the transmission of data sent by Node B (such as a request to reconnect, an ACK packet, a disconnect command, etc.).
3) Prior knowledge of the access scheme.

Figure 7C:
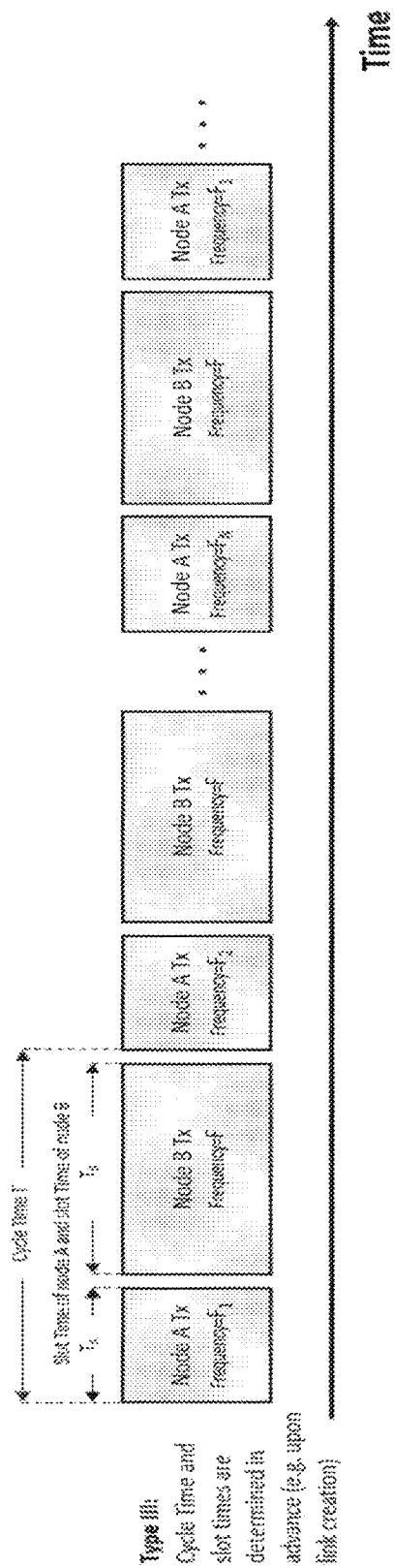

Exemplary embodiments include:
1) The aggregated disconnect signal is transmitted a predefined time after the Node B transmission ends. This approach is effective when Node B is the master and manages the time frames and Node A responds to Node B, as illustrated in FIG. 7A.
2) The aggregated disconnect signal is transmitted a predefined time before a predicted Node B time slot. This approach is effective in the timing scenarios illustrated in FIGS. 7B and 7C. In FIG. 7B, Node A is the master and Node B responds to Node B, typically after a relatively short buffer time. FIG. 7C illustrates the case where the cycle time, T, and slot times, TA and TB, are determined in advance, for example when the link is created. If this pattern is known, once a Node A or Node B time slot is identified the timing of future time slots is known.

V. Controlling a Disconnect Apparatus

Figure 8:
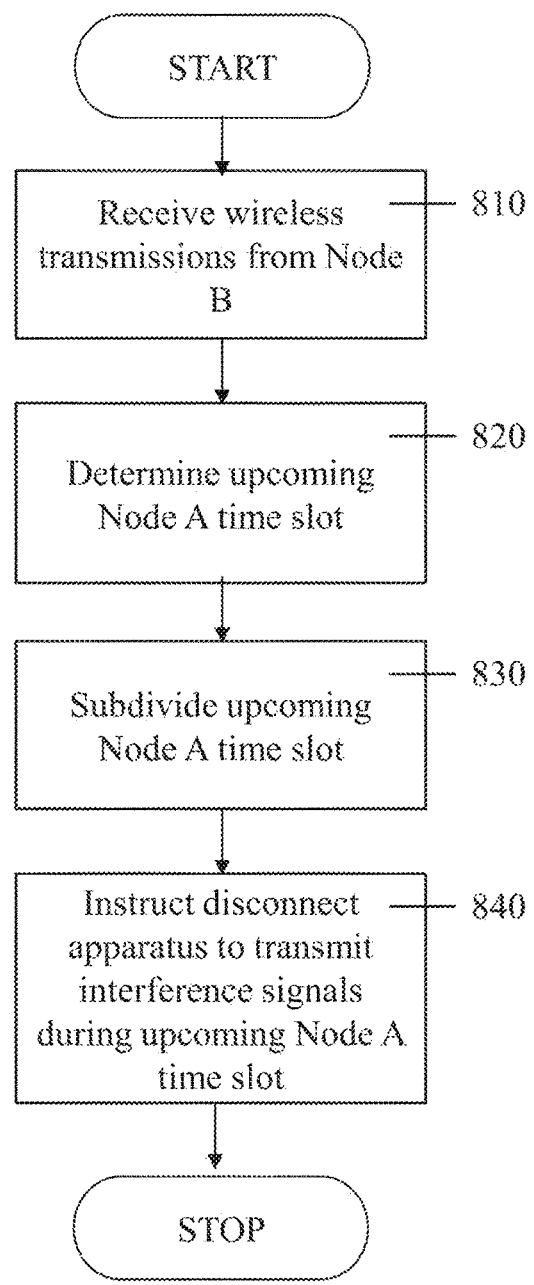
FIG. 8 is a simplified flowchart of a method for controlling a disconnect apparatus, according to embodiments of the invention.

Reference is now made to FIG. 8, which is a simplified flowchart of a method for controlling a disconnect apparatus interfering with wireless time-division duplex communication, according to embodiments of the invention. This control is based on information gathered by receiving and analyzing signals transmitted by Node B.

In 810, wireless transmissions are received from Node B.

In 820, an upcoming Node A time slot is determined based on the received transmissions. Optional techniques for performing this determination are described above (e.g. identifying the end of a Node B time slot, by prior knowledge of the timing of the time slots, etc.).

In 830, the upcoming Node A time slot is subdivided into consecutive time intervals.

In 840, the disconnect apparatus is instructed to transmit, during the Node A time slot determined in 820, an aggregated disconnect signal is built based on the respective frequency bands assigned to time intervals within the time slot. The frequency band assignment may be designed to yield any type or types of aggregated disconnect signals described herein, as required for a specific embodiment.

Optionally, the instructions to the disconnect apparatus include at least one signal parameter for generation of the disconnect signals. Signal parameters for generating the disconnect signals include but are not limited to:
  i) Type of disconnect signal to transmit;
  ii) Data for modulating onto the disconnect signal;
  iii) The duration of the time slot;
  iv) Respective durations of the time intervals;
  v) Respective frequency bands for the disconnect signals;
  vi) Respective transmission powers for the disconnect signals; and
  vii) The number of disconnect signals to transmit in parallel.

Optionally, the disconnect apparatus is instructed to modulate a disconnect command onto at least one of the disconnect signals.

Optionally, the method further includes detecting that Node A and Node B are disconnected (e.g. the TDD communication link has been successfully interfered with). The disconnect apparatus is then instructed to establish direct communication with the Node B. Optionally, communication is established with Node B by transmitting a request to connect with Node B at high power.

VI. Controller for Disconnect Apparatus

Figure 9:
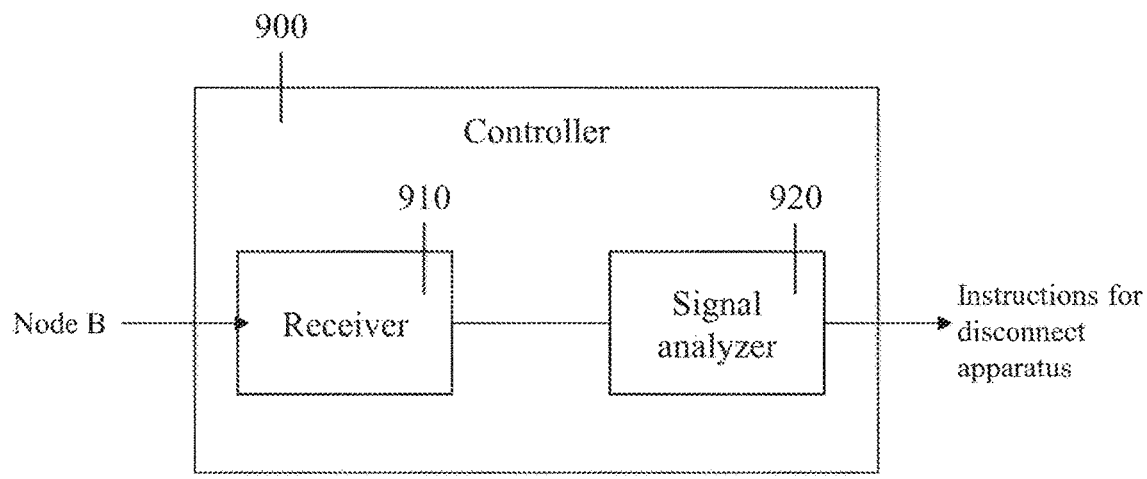
FIG. 9 is a simplified block diagram of a controller for a wireless disconnect apparatus, according to embodiments of the invention.

Reference is now made to FIG. 9, which is a simplified block diagram of a controller for a wireless disconnect apparatus, according to embodiments of the invention. Controller 900 includes receiver 910 and signal analyzer 920, which together implement the method shown in FIG. 8.

Receiver 910 receives wireless transmissions from the Node B. Signal analyzer 920 analyzes the received signals to determine an upcoming time slot allocated to Node A and to subdivide the Node A time slot into consecutive time intervals. Signal analyzer 920 also instructs the disconnect apparatus how the aggregated disconnect signal should be built and when it should be transmitted.

Optionally, receiver 910 performs analog and/or digital processing on the received signal before providing it signal analyzer 920. For example, receiver 910 may include an analog-to-digital converter which converts the received Node B signal to a digital signal which is analyzed by signal analyzer 920.

In the embodiment of FIG. 9, receiver 910 and signal analyzer 920 are a single apparatus. In alternate embodiments, signal analyzer 920 is an add-on unit which provides the aggregated disconnect signals to a standalone transmitter.

VII. Exemplary Disconnect Apparatus

Figure 10:
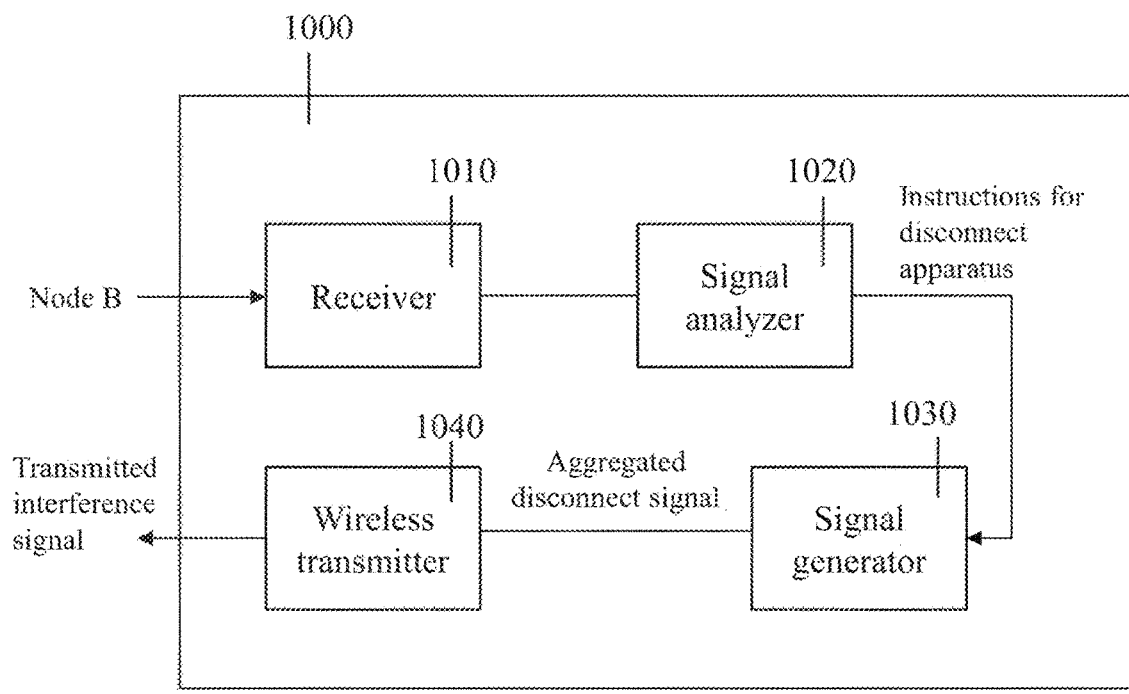
FIG. 10 is a simplified block diagram of a disconnect apparatus, according to an exemplary embodiment of the invention.

Reference is now made to FIG. 10, which is a simplified block diagram of a disconnect apparatus, according to an exemplary embodiment of the invention. Disconnect apparatus 1000 includes the components shown in FIGS. 6 and 9. Receiver 1010 receives signals transmitted by Node B. Signal analyzer 1020 analyzes the received signals, determines an upcoming Node A time slot and/or decides how the aggregated disconnect signal should be built for the Node A time slot. These instructions are provided to signal generator 1030, which generates the aggregated disconnect signal for transmission by wireless transmitter 1040.

The combined operation of signal analyzer 1020 and signal generator 1030 may perform any of the analyses described herein and generate any of the disconnect signals and aggregated disconnect signals described herein. For brevity, the complete details of all possible embodiments are not repeated but they are encompassed by disconnect apparatus 1000.

In the embodiment shown in FIG. 10, receiver 1010, signal analyzer 1020, signal generator 1030 and transmitter 1040 form a single apparatus. In alternate embodiments, the receiver and/or transmitter are external. It should be noted that interference signals may be disconnect signals aimed to disconnect the first node from the second node. It should also be noted that the interference signals may differ from disconnect signals.

Transmit Spectrum Mask Compliancy

The interference signals may be transmitted in an urban environment, an environment near airports, or in any environment in which a transmit spectrum mask is imposed—thereby limiting the disruption to uninvolved systems.

It has been found that transmit spectrum mask compliancy can be obtained by imposing one or more limitations on a frequency difference between members of a pair of consecutive interference signals.

Additionally or alternatively, the transmit spectrum mask compliancy can be obtained by imposing one or more limits on a frequency change rate between members of a pair of consecutive interference signals.

Any limit may be provided as an absolute value or may be defined differently—for example be a related to number of a plurality of frequency bands used by a first node.

The frequency difference may be calculated based on a difference between frequency bands in which the members of a pair of consecutive interference signals are transmitted.

The consecutive interference signals may be transmitted in order to disrupt communication between a first node and a second node that use a time-division duplex communication link. The transmission is made during time slots allocated to said first node, wherein the second node is transmitting during separate time slots allocated to said second node, said first node transmitting at a respective one of a plurality of frequency bands during each of said time slots allocated to said first node.

It should be noted that a time slot may be sub-divided into consecutive time intervals.

The disruption signals may be transmitted during all of the consecutive time intervals or during none, one of only some of the consecutive time intervals.

Members of a pair of consecutive interference signals may be transmitted during a pair of consecutive time intervals.

Alternatively, members of a pair of consecutive interference signals may be transmitted during a pair of non-consecutive time intervals.

Thus, there may be a gap of one or more consecutive time intervals between members of a pair consecutive interference signals. Such a gap may reduce the frequency change rate. The gap may be determined based on a frequency difference between frequency bands of the member of a pair consecutive interference signals and based on frequency rate change limitations.

As indicated above—the first node transmits at a respective one of a plurality of frequency bands during each of said time slots allocated to said first node.

A disruption signal may be transmitted in any one of the plurality of frequency bands—but may also be transmitted at least one additional frequency band that does not belong to the plurality of frequency bands.

The additional frequency band may be used to bridge a gap between frequency bands (of the plurality of frequency bands) and/or for complying with a frequency rate change limitation.

The frequency bands in which disruption signals are transmitted may form a group of frequency bands.

It should be noted that the plurality of frequency bands may form one or more subsets of frequency bands.

The frequency gap between two or more subsets may exceed a width of the subset—which is the difference between highest frequency and lowest frequency of the subset. In such a case the disruption signals may be grouped to multiple groups of frequency bands—for example one group per spaced apart subset.

One of the major attributes that may affect the spectral mask is the method the signal changes between the hops. Signal properties, such as rise time and fall time of the radio signal or fast frequency transitions may cause momentarily high bandwidth, affecting the total spectral mask and forcing the transmitter to reduce power in order to comply with spectral mask requirements.

When having a fast transition between hops in different frequencies, there are several methods for handling the transition, in order to assure low spectral mask—two are listed below.

The transition from one interference signal (one hop) to an adjacent interference signal (second hop) may include making a smooth transition between the two hops by continuous transmission of a signal and slowly changing the frequency during the transition between the two hops. The frequency change can be linear, i.e. linearly changing the signal frequency (for example by linearly changing the VCO or the NCO input) between the signals. But the frequency change may be done using other transition functions between the two frequencies, such as a gaussian step, a cosine step or any other continuous function from one frequency to the other.

The transition from one interference signal (one hop) to an adjacent interference signal (second hop) may include slowly reducing the power of one hop and raising the power of the next hop using a window, such as a triangle window, a Hamming window, a Hann window, a raised cosine window, a Gausian window, Kaiser window or any other type of window types for those who are familiar with the art. The fall time of the first hop and the rise time of the second hop may occur consequently, but may also occur in parallel, as long as the total power is kept below some restricted maximum value.

Figure 11:
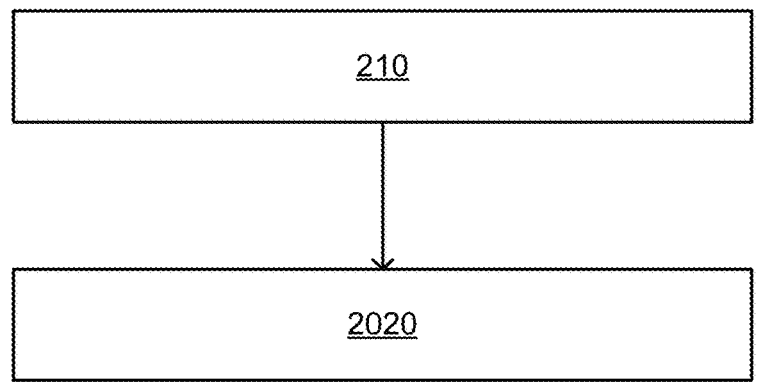
FIG. 11 is an example of a method.

Reference is now made to FIG. 11, which is a simplified flow chart of a method 2000 for disconnecting a wireless time-division duplex communication link, according to embodiments of the invention. The time-division duplex (TDD) communication link is between a first node (denoted herein Node A) transmitting during time slots allocated to Node A and a second node (denoted herein Node B) transmitting during separate time slots allocated to Node B.

As used herein the term "separate time slots" means that Node A's time slots do not overlap with Node B's time slots.

Node A transmits at a plurality of frequency bands. During each of its allocated time slots, Node A transmits at a respective one of these frequency bands. Node A may transmit in a fixed hop pattern (i.e. in a predetermined repetitive order) or the frequency bands used by Node A transmission may vary in a different manner. The frequency bands used by Node A should be known or detectable by Node B, so that Node B is able to receive Node A's transmissions correctly.

Method 2000 may start by step 210.

In step 210 a time slot allocated to the first node is sub-divided into consecutive time intervals. Methods for identifying or determining a Node A time slot are described below.

Step 210 may be followed by step 2020.

Step 2020 may include disrupting communication between said first node and said second node by transmitting, using a transmitter, respective interference signals during at least some of said time intervals, each of said interference signals being transmitted on one frequency band selected from a group of frequency bands, the group of frequency bands includes the plurality of frequency bands, wherein for at least two of said time intervals said interference signals are transmitted on different frequency bands.

The transmission includes imposing one or more limits on a frequency difference between members of a pair of consecutive interference signals and/or imposing one or more limits on a frequency change rate between members of a pair of consecutive interference signals.

An example of one or more frequency difference limitations include: (i) the transmission may be executed while maintaining a frequency difference between any pair of consecutive interference signals below a frequency difference threshold, and (ii) the frequency difference threshold does not exceed a portion of a frequency gap between (a) a lowest frequency band of the plurality of frequency bands and (b) a highest frequency band of the plurality of frequency bands.

An example of one or more frequency change rate limitations may include: (i) the transmission may be executed while maintaining a frequency change rate difference between any pair of consecutive interference signals below a frequency change rate difference threshold, and (ii) the frequency change rate difference threshold does not exceed a ratio between (i) a portion of a frequency gap between (a) a lowest frequency band of the plurality of frequency bands and (b) a highest frequency band of the plurality of frequency bands, and (ii) a duration of a time interval.

In 2020, respective disconnect signals are transmitted during some or all of the time intervals. Each disconnect signal may be of a frequency band of a group of frequency bands. The group includes the plurality of frequency bands. The group may include additional frequency bands. The group may be limited to the plurality of frequency bands.

Step 2020 is executed while imposing one or more limits on a frequency difference between members of a pair of consecutive interference signals and/or while imposing one or more limits on a frequency change rate between members of a pair of consecutive interference signals.

For example—step 2020 may impose the following limit of the frequency difference. For example—the transmission may be executed while maintaining a frequency difference between any pair of consecutive interference signals below a frequency difference threshold. The frequency difference threshold may not exceed a portion of a frequency gap between (a) a lowest frequency band of the plurality of frequency bands and (b) a highest frequency band of the plurality of frequency bands. The potion may be (1/X) of the frequency gap and x may exceed, for example, 1.5, 2, 4, 6, 7, 9, 10, 12, and even more.

The disconnect signals are transmitted on different frequency bands during at least two of the time intervals. Optionally, when Node A's frequency bands are not accurately known, disconnect signals are transmitted at frequency bands which are expected to be used by Node A.

Optionally, during a single Node A time the disconnect signals cover the entire frequency range used by the Node A.

Optionally, the respective frequency bands for the disconnect signals are selected from a specified list of frequency bands. The list may include frequency bands known to be used by Node A. This approach is beneficial when Node A does not transmit over a continuous frequency range but rather at certain frequency bands within its total frequency range.

As used herein the term "aggregated disconnect signal" means the entire disconnect signal transmitted in a single time slot. The aggregated disconnect signal is built from the multiple short disconnect signals which are transmitted during respective time intervals within a single time slot. The aggregated disconnect signal may be built in the same manner for all Node A time slots, or in different manners for different time slots. For example, in some Node A time slots the aggregated disconnect signal may cover Node A's entire frequency range whereas in other time slots only a portion or portions of Node A's frequency range is interfered with.

Optionally, a single disconnect signal (i.e. a signal at a single frequency band) is transmitted in each time interval, therefore the transmission power is concentrated in one frequency band.

Regarding step 2020—at least one of the following is true:

The portion does not exceed a certain value (for example 2 or 4) divided by a number of frequency bands of the plurality of frequency bands. The certain value may differ from 2 or 4—but may be selected so that the portion is less than the frequency gap.

The frequency bands associated with different time intervals may form various patterns—for example may include one or more sets of ascending frequency bands and/or one or more sets of descending frequency bands and/or one or more sets of a fixed frequency band.

Different sets of frequency bands may be of the same duration (in time intervals) and/or of the same number of members.

Different sets of frequency bands may differ from each other by at least one of duration (in time intervals) and/or differ from each other by number of members.

Different sets of frequency bands may be of the same range (difference between lowest frequency of the set and highest frequency of the set) or be of different range.

A single frequency band may start one set and end another set.

A single frequency band may belong to a single frequency band.

Consecutive time intervals may include a first group of consecutive time intervals and a second group of consecutive time intervals.

The disrupting may include transmitting, during the first group of consecutive time intervals, a first set of interference signals of ascending frequency bands; and transmitting, during the second group of consecutive time intervals, a second set of interference signals of descending frequency bands.

Each one of the ascending frequency bands differs from each one of the descending frequency bands.

For each frequency band of at least some of the ascending frequency bands, the frequency band is located between a pair of consecutive descending frequency bands.

An ordered list of the ascending frequency bands and a reverse ordered list of the descending frequency bands form an alternating sequence of frequency bands, the ordered list is ordered according to a time of transmission.

Consecutive interference signals of the first set exhibit a frequency gap that is not lower than twice a frequency gap between consecutive frequencies of the plurality of frequency bands.

An ordered list of the ascending frequency bands may include subsets of consecutive frequency bands of the plurality of frequency bands, consecutive subsets are spaced apart by a frequency gap that is not lower than twice a frequency gap between consecutive frequencies of the plurality of frequency bands.

The consecutive time intervals comprise one or more additional time intervals in addition to the first group of consecutive time intervals and in addition to the second group of consecutive time intervals.

The disrupting may include transmitting disruption signals at some or more of the ascending frequency bands during the additional time intervals.

The disrupting may include transmitting disruption signals at some or more of the descending frequency bands during the additional time intervals.

The disrupting may include transmitting one or more disruption signals at one or more frequency bands that do not belong to the ascending frequency bands and do not belong to the descending frequency bands during the additional time intervals.

A frequency gap between each pair of consecutive ascending frequency gaps equals a frequency gap between each pair of consecutive descending frequency bands.

The first group of consecutive time intervals precedes the second group of consecutive time intervals.

The first group of consecutive time intervals follows the second group of consecutive time intervals.

An ordered list of the descending frequency bands may include subsets of consecutive frequency bands of the plurality of frequency bands, consecutive subsets are spaced apart by a frequency gap that is not lower than twice a frequency gap between consecutive frequencies of the plurality of frequency bands.

Consecutive interference signals of the second set exhibit a frequency gap that is not lower than twice a frequency gap between consecutive frequencies of the plurality of frequency bands.

Selecting at least some of the transmission bands, out of the plurality of frequency bands, in a random manner.

Selecting at least some of the transmission bands, out of the plurality of frequency bands, in a random manner while imposing a predefined coverage condition, during the time slot, of frequency bands.

Deviating from a predefined transmission scheme following an occurrence of an event.

The event may include synchronizing with a transmission between the first node and the second node.

The event may include locking on a signal exchanged over the communication link.

The transmitting may include transmitting interference signals of at least one pair of consecutive interference signals during consecutive time intervals.

The transmitting may include transmitting interference signals of at least one pair of consecutive interference signals during spaced apart time intervals.

Transmitting, during a first time interval, first interference signals.

Avoiding from transmitting interference signals during one or more intermediate time intervals.

Transmitting, during a second time interval, second interference signals; the first time interval, the one or more intermediate time intervals and the second time intervals form a continuous sequence of time intervals.

The group may include the plurality of frequency bands and at least one additional frequency band.

The group may include only the plurality of frequency bands.

The method may include determining to use another group of frequency bands; and disrupting the communication between said first node and said second node using the other group of frequency bands.

The using of the other group of frequency bands may include disrupting communication between said first node and said second node by transmitting, using the transmitter, respective interference signals during at least some of said time intervals while maintaining the frequency difference between any pair of consecutive interference signals below the frequency difference threshold, each of said interference signals being transmitted on one frequency band selected from the other group of frequency bands, the other group of frequency bands may include the plurality of frequency bands.

Determining to use the other group of frequency bands in response to an occurrence of an event.

Determining to use the other group of frequency bands based on a predefined schedule.

Alternating between multiple groups of frequency bands.

Transmission in a simple progressive series, while performing modulo on the serial number of the channels: Ch(n)=Ch(0)+(delta*n) mod N Where Ch(n) is the serial number of the channel used at timeslot=n, Ch(0) is set to one of the possible index values {0, . . . , N-1}, and N is the number of channels in the group of possible frequency bands used by the first node. delta is the difference between serial numbers of channels used in consecutive disruption signals, which can be any integer. In order to make sure that all channel numbers are being used, delta should satisfy GCD (delta, N)=1.

Transmission in the same series expected by the second node.

In case specific phase of the first node is not known, one can attempt several hypothesis of this phase and attempt different series.

Transmission using ascending even (when frequency bands are ordered) frequency bands and then transmission using descending odd frequency bands.

For example—transmitting disruption signals in the following frequency bands:

FB(0), FB(2), FB(4), FB(N-4), . . . , FB(N-2), FB(N-1), FB(N-3), . . . , FB(3), FB(1) (N is even)

FB(0), FB(2), FB(4), . . . , FB(N-3), FB(N-1), FB(N-2), FB(N-4), . . . , FB(3), FB(1) (N is odd)

FB(1), FB(3), FB(5), . . . , FB(N-3), FB(N-1), FB(N-2), FB (N-4), . . . , FB(2), FB(0) (N is even)

FB(1), FB(3), FB(5), FB(N-4), FB(N-2), FB(N-1), FB(N-3), . . . , FB(2), FB(0) (N is odd)

Where FB(n) is the $n^{th}$ frequency band in the group of frequency bands used by the first node when they are ordered in ascending order.

Transmitting disruption signals using a series of frequency bands as illustrated above, when one or more of the frequency bands are transmitted more than once per cycle.

Transmitting disruption signals using a random order (randomly selected) of frequency bands. Whereas the random order may be amended to prevent deviations from the frequency and/or frequency change rate limits.

Transmitting disruption signals using a specific order of frequency bands and changing, each one or more cycle (one of the above) the order of frequency bands Transmitting various types of transition signals, such as a linear frequency changing signal ("chirp") to smooth the transmission and avoid fast ramp of signal, that may result in failing to comply a transmission spectrum mask.

Figure 12:
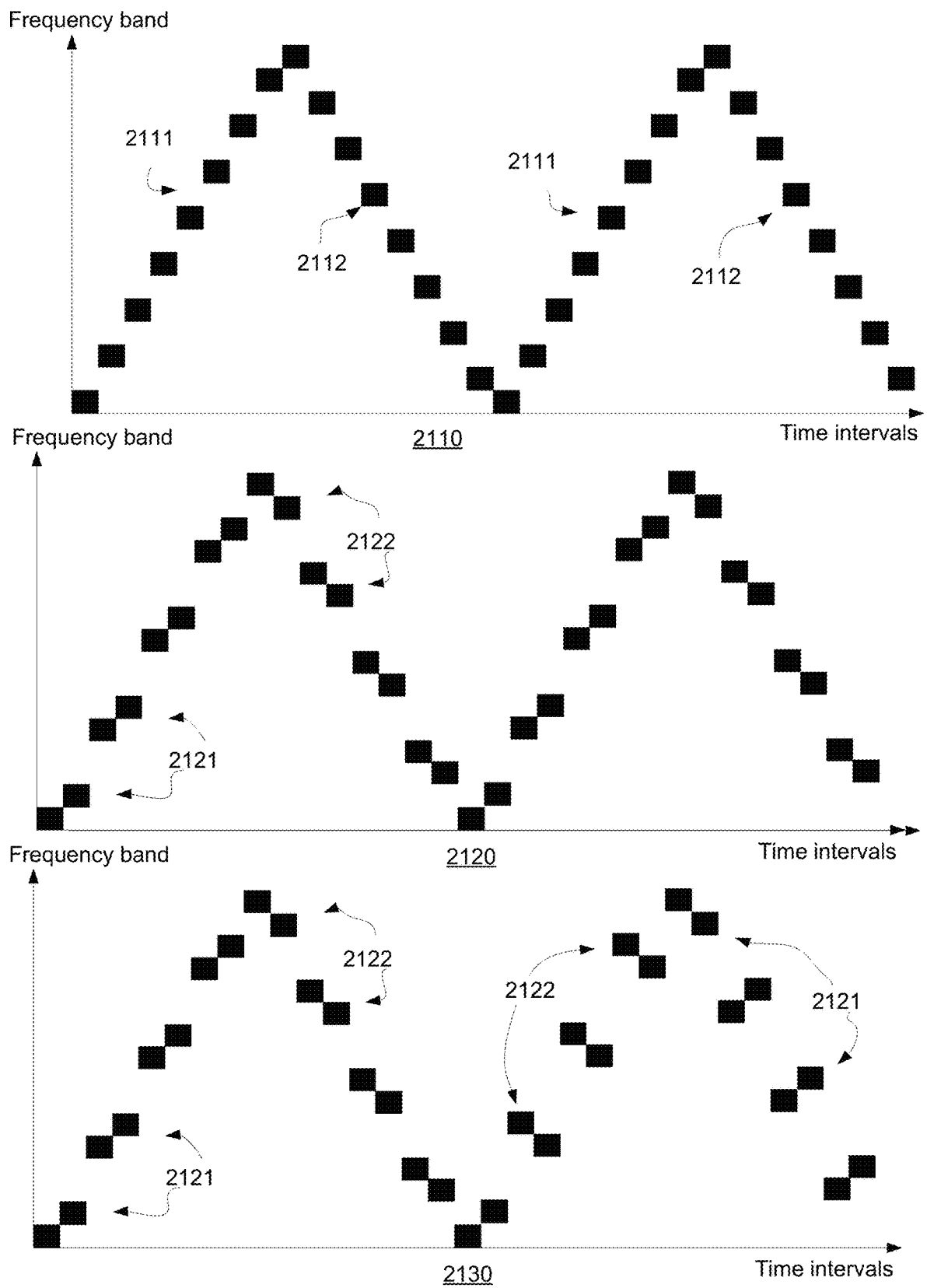
FIGS. 12-14 are examples of timing diagrams.
Figure 13:
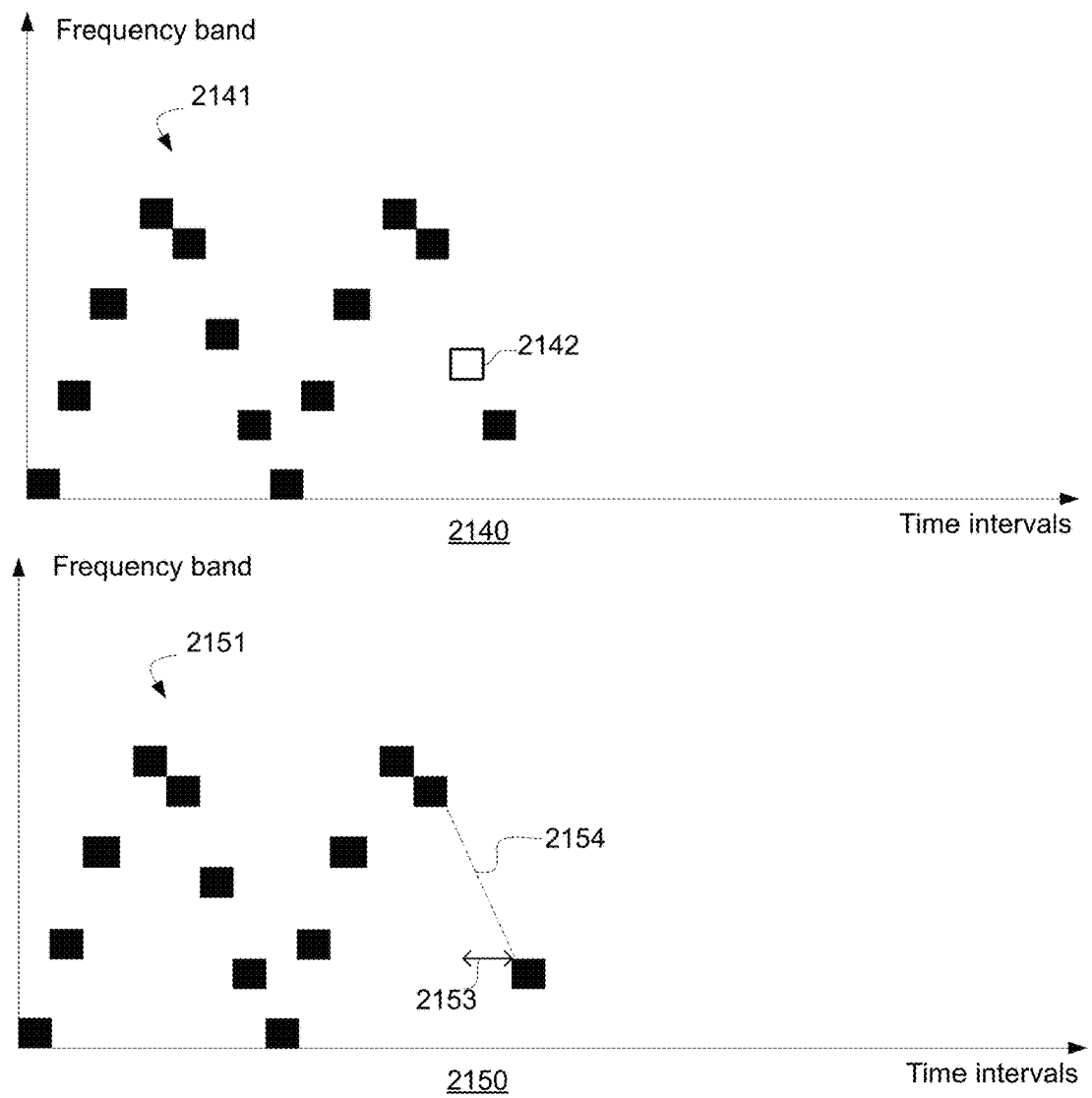
Figure 14:
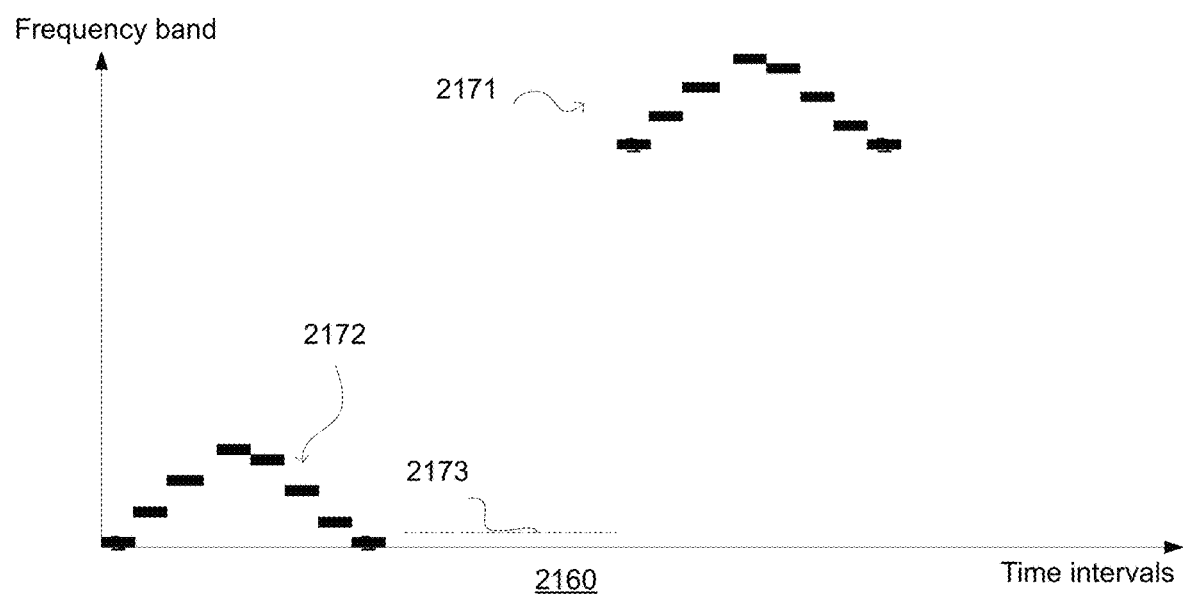
Figure 14:
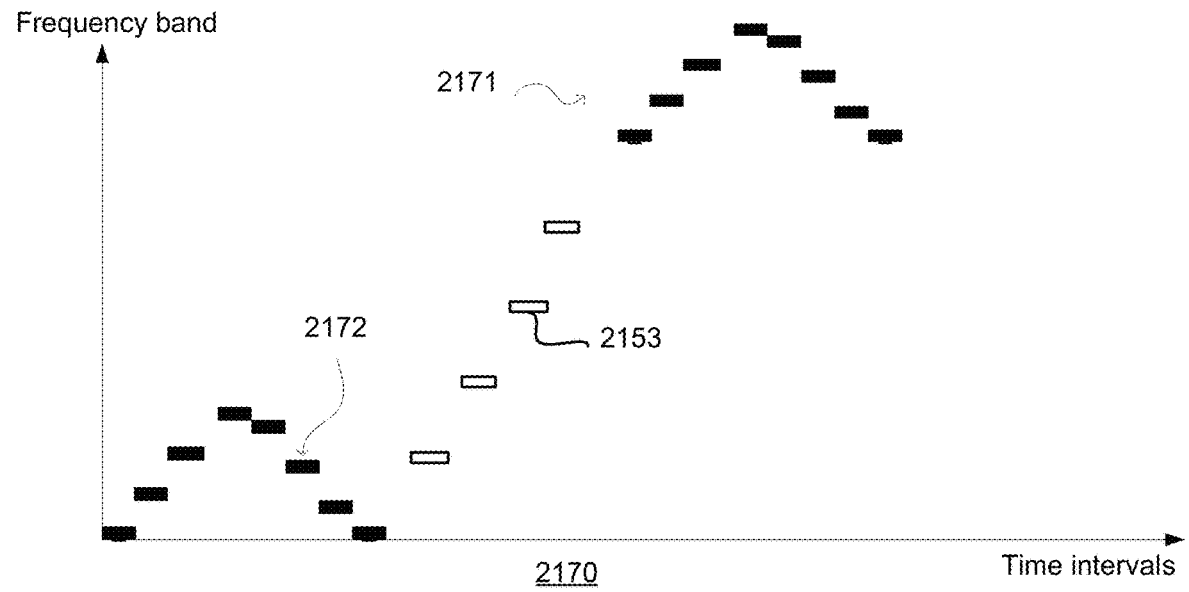

FIGS. 12-14 illustrates examples of disruption signals transmitted during time intervals. The X-axis is indicative of time of transmission. The Y-axis illustrates the frequency bands.

Timing diagram 2110 of FIG. 12 illustrates a plurality of sixteen frequency bands, and two repetitions a first set 2111 of interference signals of ascending frequency bands (even frequency bands), a second set of interference signals of descending frequency bands (odd frequency bands) 2112. It should be noted that the ascending frequency bands may include the odd frequency bands and the descending frequency bands may include the even frequency bands.

Timing diagrams 2120 and 2130 illustrate a plurality of sixteen frequency bands, and different combination of ascending sub-sets 2121 of frequencies, and descending sub-sets 2122 of frequencies.

An ascending sub-set of frequencies may belong to a an ascending set of frequencies or may belong to a descending set of frequencies—and the same may be applied, mutatis mutandis to a descending set of frequencies.

Timing diagram 2140 of FIG. 13 illustrates a plurality of eight frequency bands 2141 that are spaced apart from each other, and a transmission of signals in an additional frequency band (not part of the eight frequency bands) 2142—for example for maintaining a frequency difference limitation.

Timing diagram 2150 of FIG. 13 illustrates a plurality of eight frequency bands 2151 that are spaced apart from each other, and time gap 2153 between transmission of two consecutive disruption signals—introduced, for example, in order to comply with a frequency change rate (the rate is illustrated by dashed line 2154) limitation.

Timing diagram 2170 of FIG. 14 illustrates a plurality of sixteen frequency that are arranged in two frequency spaces 2171 and 2172 that are distant from each other, and a transmission of signals in an additional frequency band (not part of the eight frequency bands) 2153—for example for maintaining a frequency difference limitation.

Timing diagram 2160 of FIG. 14 illustrates a plurality of sixteen frequency that are arranged in two frequency spaces 2171 and 2172 that are distant from each other, and a time gap 2173 between transmission of two consecutive disruption signals—introduced, for example, in order to comply with a frequency change rate limitation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant TDD communication links, communication protocols and nodes communicating over a TDD communication link will be developed and the scope of the term TDD, TDD communication link, protocol and node is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 6, from 2 to 4, from 2 to 6, from 3 to 6 etc., as well as individual numbers within that range, for example, 1, 2, 3, 4, 6, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

We claim:

1. A method for disconnecting a wireless time-division duplex communication link, said time-division duplex communication link being between a first node transmitting during time slots allocated to said first node and a second node, wherein the second node is transmitting during separate time slots allocated to said second node, said first node transmitting at a respective one of a plurality of frequency bands during each of said time slots allocated to said first node, said method comprising:
    sub-dividing a time slot allocated to said first node into consecutive time intervals;
    disrupting communication between said first node and said second node by transmitting, using a transmitter, respective interference signals during at least some of said time intervals while maintaining a frequency difference between any pair of consecutive interference signals below a frequency difference threshold, each of said interference signals being transmitted on one frequency band selected from a group of frequency bands, the group of frequency bands comprises the plurality of frequency bands, wherein for at least two of said time intervals said interference signals are transmitted on different frequency bands, wherein the frequency difference threshold does not exceed a portion of a frequency gap between (a) a lowest frequency band of the plurality of frequency bands and (b) a highest frequency band of the plurality of frequency bands, wherein the frequency difference threshold is dynamically adjusted based on a transmit spectrum mask requirement for limiting disruption to uninvolved systems in an urban environment or near airports.

2. A method according to claim 1, wherein the portion does not exceed two divided by a number of frequency bands of the plurality of frequency bands.

3. A method according to claim 1, wherein the portion does not exceed four divided by a number of frequency bands of the plurality of frequency bands.

4. A method according to claim 1, wherein the consecutive time intervals comprise a first group of consecutive time intervals and a second group of consecutive time intervals.

5. The method according to claim 4 wherein the disrupting comprises transmitting, during the first group of consecutive time intervals, a first set of interference signals of ascending frequency bands; and transmitting, during the second group of consecutive time intervals, a second set of interference signals of descending frequency bands.

6. The method according to claim 5, wherein each one of the ascending frequency bands differs from each one of the descending frequency bands.

7. The method according to claim 5 wherein for each frequency band of at least some of the ascending frequency bands, the frequency band is located between a pair of consecutive descending frequency bands.

8. The method according to claim 5 wherein an ordered list of the ascending frequency bands and a reverse ordered list of the descending frequency bands form an alternating sequence of frequency bands, the ordered list is ordered according to a time of transmission.

9. The method according to claim 5 wherein consecutive interference signals of the first set exhibit a frequency gap that is not lower than twice a frequency gap between consecutive frequencies of the plurality of frequency bands.

10. The method according to claim 5, wherein an ordered list of the ascending frequency bands comprises first subsets of consecutive frequency bands of the plurality of frequency bands, wherein first consecutive subsets are spaced apart by a frequency gap that is not lower than twice a frequency gap between consecutive frequencies of the plurality of frequency bands.

11. The method according to claim 5, wherein the consecutive time intervals comprise one or more additional time intervals in addition to the first group of consecutive time intervals and in addition to the second group of consecutive time intervals.

12. The method according to claim 11 wherein the disrupting comprises transmitting disruption signals at some or more of the ascending frequency bands during the one or more additional time intervals.

13. The method according to claim 11 wherein the disrupting comprises transmitting disruption signals at some or more of the descending frequency bands during the one or more additional time intervals.

14. The method according to claim 11 where the disrupting comprises transmitting one or more disruption signals at one or more frequency bands that do not belong to the ascending frequency bands and do not belong to the descending frequency bands during the additional time intervals the one or more additional time intervals.

15. The method according to claim 5 wherein a frequency gap between each pair of consecutive ascending frequency gaps equals a frequency gap between each pair of consecutive descending frequency bands.

16. The method according to claim 5 wherein the first group of consecutive time intervals precedes the second group of consecutive time intervals.

17. The method according to claim 5 wherein the first group of consecutive time intervals follows the second group of consecutive time intervals.

18. The method according to claim 5, wherein an ordered list of the descending frequency bands comprises second subsets of consecutive frequency bands of the plurality of frequency bands, wherein second consecutive subsets are spaced apart by a frequency gap that is not lower than twice a frequency gap between consecutive frequencies of the plurality of frequency bands.

19. The method according to claim 5 wherein consecutive interference signals of the second set exhibit a frequency gap that is not lower than twice a frequency gap between consecutive frequencies of the plurality of frequency bands.

20. The method according to claim 1, comprising selecting at least some of the frequency bands, out of the plurality of frequency bands, in a random manner.

21. The method according to claim 1, comprising selecting at least some of the frequency bands, out of the plurality of frequency bands, in a random manner while imposing a predefined coverage condition, during the time slot, of frequency bands.

22. The method according to claim 1, comprising deviating from a predefined transmission scheme following an occurrence of an event.

23. The method according to claim 22 wherein the event comprises synchronizing with a transmission between the first node and the second node.

24. The method according to claim 22 wherein the event comprises locking on a signal exchanged over the communication link.

25. The method according to claim 1 wherein the transmitting comprises transmitting interference signals of at least one pair of consecutive interference signals during consecutive time intervals.

26. The method according to claim 1 wherein the transmitting comprises transmitting interference signals of at least one pair of consecutive interference signals during spaced apart time intervals.

27. The method according to claim 1 comprising (a) transmitting, during a first time interval, first interference signals, (b) avoiding from transmitting interference signals during one or more intermediate time intervals, and (c) transmitting, during a second time interval, second interference signals; wherein the first time interval, the one or more intermediate time intervals and the second time intervals form a continuous sequence of time intervals.

28. The method according to claim 1 wherein the group of frequency bands comprises the plurality of frequency bands and at least one additional frequency band.

29. The method according to claim 1 wherein the group of frequency bands comprises only the plurality of frequency bands.

30. The method according to claim 1 comprising determining to use another group of frequency bands; and disrupting the communication between said first node and said second node using the other group of frequency bands.

31. The method according to claim 30 wherein the using of the other group of frequency bands comprises disrupting communication between said first node and said second node by transmitting, using the transmitter, respective interference signals during at least some of said time intervals while maintaining the frequency difference between any pair of consecutive interference signals below the frequency difference threshold, each of said interference signals being transmitted on one frequency band selected from the other group of frequency bands, the other group of frequency bands comprises the plurality of frequency bands.

32. The method according to claim 30 comprising determining to use the other group of frequency bands in response to an occurrence of an event.

33. The method according to claim 30 comprising determining to use the other group of frequency bands based on a predefined schedule.

34. The method according to claim 30 comprising alternating between multiple groups of frequency bands.

35. The method according to claim 1 comprising determining at least one property of at least some of the respective interference signals based on an event.

36. The method according to claim 35 wherein the at least one property is a frequency.

37. The method according to claim 35 wherein the event comprises receiving an indication sent through the communication link about the at least one property of future transmissions over the communication link.

38. The method according to claim 35 wherein the event comprises receiving a command sent over the communication link.

39. The method according to claim 35 wherein the event comprises receiving information sent over the communication link.

40. A method for disconnecting a wireless time-division duplex communication link, said time-division duplex communication link being between a first node transmitting during time slots allocated to said first node and a second node wherein the second node is transmitting during separate time slots allocated to said second node, said first node transmitting at a respective one of a plurality of frequency bands during each of said time slots allocated to said first node, said method comprising:
- sub-dividing a time slot allocated to said first node into consecutive time intervals;
- disrupting communication between said first node and said second node by transmitting, using a transmitter, respective interference signals during at least some of said time intervals while maintaining a frequency change rate difference between any pair of consecutive interference signals below a frequency change rate difference threshold, each of said interference signals being transmitted on one of said frequency bands, wherein for at least two of said time intervals said interference signals are transmitted on different frequency bands, wherein the frequency change rate difference threshold does not exceed a ratio between (i) a portion of a frequency gap between (a) a lowest frequency band of the plurality of frequency bands and (b) a highest frequency band of the plurality of frequency bands, and (ii) a duration of a time interval, wherein the frequency change rate difference threshold is dynamically adjusted based on a transmit spectrum mask requirement for limiting disruption to uninvolved systems in an urban environment or near airports.

* * * * *